United States Patent
Dubuc

(10) Patent No.: US 9,775,214 B2
(45) Date of Patent: Sep. 26, 2017

(54) BATTERY BACKUP SYSTEM FOR LED LUMINAIRE

(71) Applicant: GE Lighting Solutions, LLC, East Cleveland, OH (US)

(72) Inventor: Eden Dubuc, Quebec (CA)

(73) Assignee: GE LIGHTING SOLUTIONS, LLC, East Cleveland, OH (US)

(*) Notice: Subject to any disclaimer, the term of this patent is extended or adjusted under 35 U.S.C. 154(b) by 216 days.

(21) Appl. No.: 14/461,542

(22) Filed: Aug. 18, 2014

(65) Prior Publication Data

US 2016/0192455 A1    Jun. 30, 2016

(51) Int. Cl.
*H05B 37/00* (2006.01)
*H05B 41/14* (2006.01)
(Continued)

(52) U.S. Cl.
CPC ........ *H05B 33/0884* (2013.01); *H02J 9/061* (2013.01); *H05B 33/08* (2013.01);
(Continued)

(58) Field of Classification Search
CPC ..... H02J 9/065; H02J 9/02; H02J 9/06; Y10T 307/625; Y10T 307/615; Y10T 307/344;
(Continued)

(56) References Cited

U.S. PATENT DOCUMENTS

| 2008/0296975 A1* | 12/2008 | Shakespeare | ........... H02J 9/065 307/66 |
| 2013/0127362 A1* | 5/2013 | Trainor | ................. G01R 31/44 315/224 |

(Continued)

FOREIGN PATENT DOCUMENTS

DE    20 2011 051 576 U1    1/2013
EP    0 723 384 A1    7/1996
(Continued)

OTHER PUBLICATIONS

European Search Report and Opinion issued in connection with corresponding EP Application No. 15179098.7 dated Mar. 29, 2016.

(Continued)

*Primary Examiner* — Alexander H Taningco
*Assistant Examiner* — Christian L Garcia
(74) *Attorney, Agent, or Firm* — Peter T. DiMauro; GE Global Patent Operation

(57) ABSTRACT

An LED light fixture includes a housing, a controller circuit having direct current (DC) and alternating-current (AC) power inputs, a direct-current (DC) power supply unit (PSU) connected to the controller circuit, an alternating-current (AC) PSU connected to the controller circuit, and at least two groups of light emitting diodes (LEDs) operable to emit light, wherein each group includes at least one LED of a first type and at least one LED of a second type. In some embodiments, when the LED light fixture operates in a security mode the controller prevents power from flowing to the AC PSU and allows power to flow to the DC PSU to power only the first type of LEDs of the at least two groups of LEDs to emit a security light.

18 Claims, 5 Drawing Sheets

(51) Int. Cl.
*H05B 33/08* (2006.01)
*F21S 9/02* (2006.01)
*H02J 9/02* (2006.01)
*H02J 9/06* (2006.01)
*H05B 41/285* (2006.01)

(52) U.S. Cl.
CPC ..... H05B 33/0845 (2013.01); H05B 33/0857 (2013.01); *F21S 9/02* (2013.01); *F21S 9/022* (2013.01); *H02J 9/02* (2013.01); *H02J 9/06* (2013.01); *H02J 9/065* (2013.01); *H05B 33/0815* (2013.01); *H05B 41/2853* (2013.01); *Y10T 307/625* (2015.04)

(58) Field of Classification Search
CPC ........ F21S 9/022; F21S 9/02; H05B 41/2853; H05B 33/0815
USPC .............. 315/86, 291, 175; 307/66, 64, 155; 362/20
See application file for complete search history.

(56) References Cited

U.S. PATENT DOCUMENTS

| | | | |
|---|---|---|---|
| 2013/0147397 A1* | 6/2013 | McBryde | H02J 9/02 315/312 |
| 2014/0167620 A1* | 6/2014 | Chobot | H05B 37/029 315/153 |

FOREIGN PATENT DOCUMENTS

| | | |
|---|---|---|
| EP | 2 477 462 A2 | 7/2012 |
| WO | 2011024062 A2 | 3/2011 |
| WO | 2013/149276 A1 | 10/2013 |

OTHER PUBLICATIONS

Tridonic, "Solutions for emergency lighting", pp. 7-30, Tridonic GmbH & Co KG, Dornbirn, Austria.

* cited by examiner

BATTERY BACKUP SYSTEM FOR LED LUMINAIRE

FIELD OF THE INVENTION

Embodiments of the present invention generally relate to a battery backup system for Light-Emitting Diode (LED) luminaires (LED-based light fixtures). In particular, when an AC power shortage occurs the battery backup components of the LED luminaire switch the LED light source groups from a normal mode of operation in which two or more different LED emitters are used, to a low-power backup mode of operation in which only one LED light source group is used.

BACKGROUND OF THE INVENTION

LED-based light fixtures are becoming increasingly more common, and manufacturers have designed LED luminaires to replace rectangular fluorescent light source fixtures. In some designs intended for indoor industrial use, the LED luminaire includes an integrated backup battery and emergency lighting circuitry that operates when AC power is removed (for example, during a power failure, or when the AC power to that luminaire is switched OFF). Thus, such LED luminaires may be purchased and installed alongside LED luminaires that do not contain a backup battery and/or emergency lighting circuitry, so that when AC power is removed a portion of the LED light fixtures in the room or warehouse illuminate to provide some lighting coverage (for example, every tenth LED luminaire ceiling fixture in a warehouse may include a backup battery and emergency lighting circuitry so that when AC power is removed at a warehouse, for example at closing time or at the end of the day, it is still possible for security guards to patrol and/or security cameras to provide images). However, the integrated backup batteries have a limited life, and LED light fixtures that contain integrated batteries can be expensive to purchase and install.

Some other conventional emergency lighting systems utilize a global back-up battery that typically is connected to only a small percentage (such as ten percent or less) of the LED light fixtures of the system. Thus, in a warehouse setting, for example, only ten percent of the LED lighting fixtures would illuminate during a power outage, and only for a limited amount of time as such global backup batteries may have a limited life (for example, one to two hours).

The present inventor recognized that a need exists for a battery backup system for LED luminaires that utilizes a global backup battery to provide adequate emergency lighting capability, and that operates efficiently in a lower power mode to provide extended backup battery life.

SUMMARY OF THE INVENTION

An LED light fixture includes a housing, a controller circuit having a direct current (DC) input and an alternating-current (AC) power input, a direct-current (DC) power supply unit (PSU) connected to the controller circuit, an alternating-current (AC) PSU connected to the controller circuit, and at least two groups of light emitting diodes (LEDs) operable to emit light. Each group of LEDs includes at least one LED of a first type and at least one LED of a second type. When the LED light fixture operates in a security mode the controller prevents power from flowing to the AC PSU and allows power to flow to the DC PSU to power only the first type of LEDs of the at least two groups of LEDs to emit a security light. In some embodiments, the security mode of operation is initiated when the controller circuit senses that AC power from the AC power input is below a predetermined AC power threshold level.

In an advantageous embodiment, a method includes sensing, by a controller circuit, that alternating current (AC) power to an LED light fixture from an AC power source is below a predetermined AC power threshold level, and switching from a normal mode of operation of the LED light fixture to a security mode of operation of the LED light fixture. The security mode of operation includes preventing alternating current (AC) power from flowing to an AC power supply unit (PSU) and to a plurality of light-emitting diode (LED) groups, wherein each LED group comprises a first type of LED and a second type of LED, and allowing direct current (DC) to flow from a DC power source to a DC PSU and to only the second type of LEDs of the plurality of LED groups to emit a security light.

Embodiments of the apparatus and methods described herein beneficially utilize LED light sources that emit light at a reduced lumen output in the security mode of operation (as compared to the lumen output in the normal mode of operation) that is acceptable for many applications, such as for security purposes and/or maintenance purposes and/or basic inventory purposes. In addition, in some embodiments a mint-white light is provided in the security mode of operation that advantageously provides a visual indication that the LED luminaire is operating in the security mode. Furthermore, since the LED light sources utilized for the security mode of operation are efficient, those LED light sources can be under-driven by a DC Power Supply Unit (PSU) driver to obtain a high efficacy LED luminaire. Put another way, using the efficient LED light sources in this manner at a lower current makes the LED luminaire more efficient, resulting in the efficient utilization of the power from a backup battery, which also results in longer battery life in comparison to conventional battery backup systems.

BRIEF DESCRIPTION OF THE DRAWINGS

Aspects and/or features of the invention and many of their attendant benefits and/or advantages will become more readily apparent and appreciated by reference to the detailed description when taken in conjunction with the accompanying drawings, which drawings may not be drawn to scale.

DETAILED DESCRIPTION

Figure 1:
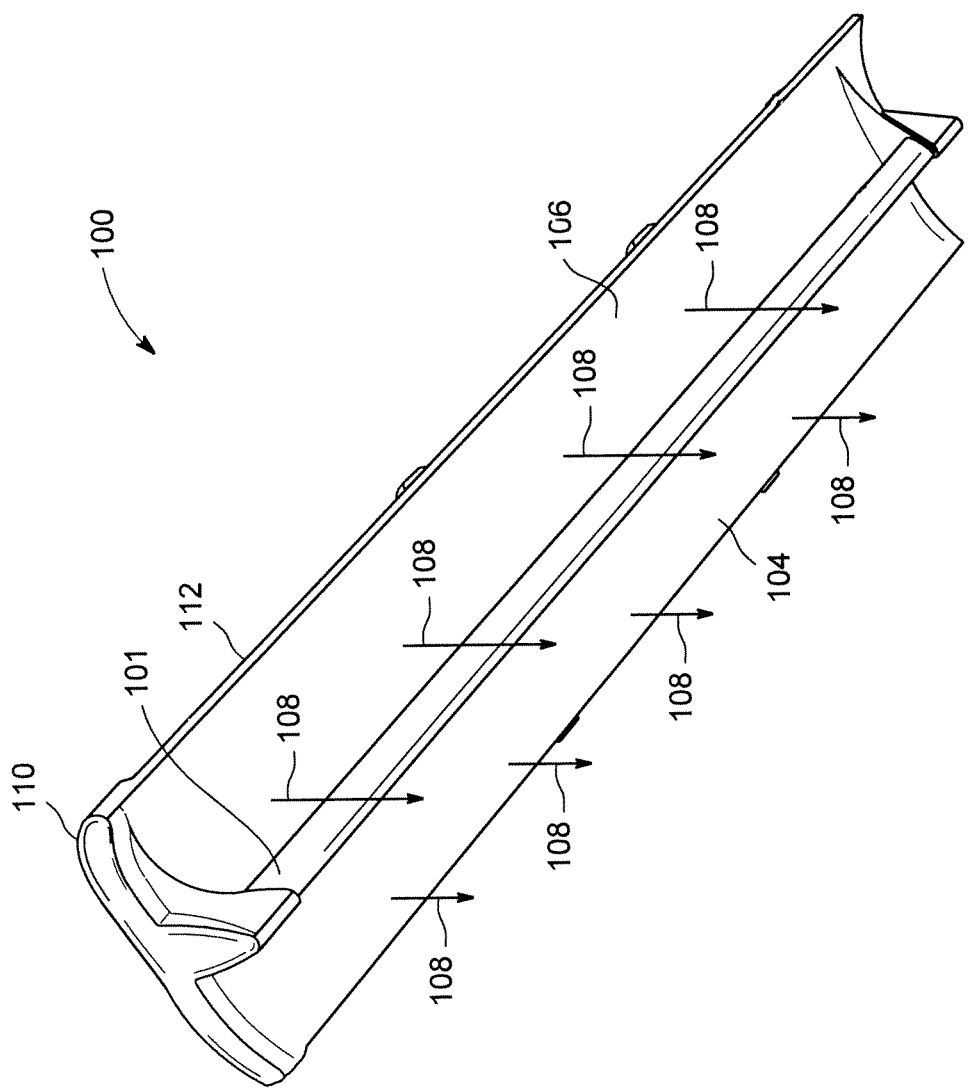
FIG. 1 is a perspective view of an LED luminaire in accordance with some embodiments of the disclosure.

In general, and for the purpose of introducing concepts of embodiments, described are Light-Emitting Diode (LED)-based lighting fixtures (or LED luminaires) that permit the propagation of light, and which may include a waveguide or reflectors to guide and/or to reflect light from the LED light sources towards an area to be illuminated. In particular, the novel LED luminaire described herein includes an Alternating Current (AC) power line utilized in a normal mode of operation and a Direct Current (DC) power line connected to a battery (a battery backup power line) that is used in a security mode of operation. When AC power is removed, the LED luminaire is operated in the security mode (using battery power) and luminaire efficacy is increased by reducing the drive current and by utilizing only the most efficient group of LEDs.

An example application includes a plurality of indoor-type LED luminaires that each include a plurality of "Blue-Shifted Yellow and Red" light-emitting diode (LED) light sources, known as "BSY+R" LED light sources. The BSY LED light sources emit a greenish-white (or mint-white) light that is mixed with a red light emitted by the Red LED to produce a white light illumination. Thus, during a normal mode of operation, the BSY+R LED light sources utilize an AC power input to provide a high efficacy white-light illumination measured in Lumens per Watt (lm/W), at a high Color Rendering Index (CRI). During a security mode of operation, which may include operation during a power outage and/or "after-hours" operation, each LED luminaire is switched to a DC power source (the battery) and controller circuitry switches over to backup power (the DC battery) to illuminate only the mint-white LEDs (the BSY LED light sources). Thus, in the security mode of operation, each LED luminaire of a plurality of LED luminaires functions on DC power with the Red LED light sources switched OFF and only the BSY LED light sources switched ON. Thus, in the security mode the BSY LED light sources emit light at a reduced lumen output as compared to normal operation, but the mint-white light that is provided is acceptable for many applications, such as for security purposes and/or maintenance purposes and/or basic inventory purposes. Beneficially, the mint-white light also provides a visual indication that the LED luminaire is operating in the security mode. Furthermore, since the BSY LED light sources are more efficient than Red LEDs, the groups of BSY LED light sources can be under-driven by a DC Power Supply Unit (PSU) driver to obtain a high efficacy LED luminaire. Put another way, using the BSY LED light sources in this manner at a lower current makes the LED luminaire more efficient, resulting in the efficient utilization of the power from the backup battery, which also results in longer battery life in comparison to conventional battery backup systems. For example, in a conventional battery-backup LED luminaire system, the LED luminaires which include backup batteries may be installed only at every fifth position in a lighting configuration that includes a plurality of LED luminaires, so that when an AC power outage occurs only each fifth LED luminaire is illuminated at full power from a DC source (the battery). Thus, each fifth LED luminaire outputs white light but with only twenty percent (20%) of the coverage as compared to when the overall lighting configuration is operating normally. In contrast, in the same situation using an identical lighting configuration, each of the novel LED luminaires described herein would be illuminated at reduced power from a single DC source to provide full lighting coverage with mint-white light, in a manner that is about thirty percent (~30%) more efficient than illuminating every fifth LED luminaire at full power.

In a particular example, in some implementations an LED luminaire operating in normal mode with BSY+R LED light sources provides a white light having a flux of 4000 lumen (lm) with an efficacy of about 130 lumen per Watt (lm/W), draws about 30 Watts of power, and has a Color Rendering Index (CRI) of about 90. In contrast, the same LED luminaire operating in the security mode using DC power from a backup battery (powering only the mint-white (BSY) LED light source groups) generates a mint-white light having flux of 1000 lm with an efficacy of about 200 lm/W, draws about 5.25 Watts of power, and has a CRI of about 65. As mentioned above, such operating performance characteristics are possible because the BSY (or mint-white) LED light sources are more efficient than the Red LED light sources, and therefore less power is required to illuminate the BSY LED light sources to produce a satisfactory mint-white security light.

FIG. 1 is a perspective view of an LED-based luminaire 100 or LED-based light fixture in accordance with an embodiment. In this example, the LED-based luminaire 100 is configured as a suspended LED fixture which is designed to hang down via wires or the like from a ceiling in a retail store, warehouse or other industrial-type indoor setting. But it should be understood that other types of LED-based luminaires could also be used in accordance with the novel aspects described herein, for example, LED luminaires designed for outdoor use and/or for household use.

Referring again to FIG. 1, the LED luminaire 100 includes a plurality of LED light sources formed in groups, such as multiple BSY+R LED light source groups (not shown), within a central housing 101. The LED light source groups are operable to provide indirect light in a downwards direction by first emitting light into the reflectors 104 and 106. The reflectors 104 and 106 are configured to redirect the light from the LED light source groups housed within the central housing 101 in the direction of arrows 108, which in this example is in the generally downward direction to provide indirect light. Accordingly, unlike traditional fluorescent light fixtures that have visible tubes, the LED-based luminaire 100 has indirect LED light source groups that create a more sophisticated impression when delivering light. Furthermore, such a design reduces glare because the light is emitted from a larger surface than a point light source. The example LED light fixture 100 also has an aerodynamic look which enhances any environment, and may be available, for example, in standard one foot by four foot (1×4) and one foot by eight foot (1×8) models that can be connected together (or "daisy-chained" to each other) to form LED light fixture runs of any desired length. Such LED light fixture runs can typically be found, for example, in retail stores and in warehouses.

In general, the LED luminaire 100 may be mounted in any effective manner, including known methods for affixing luminaires to ceiling tiles and the like. Other lighting components such as control circuitry (not shown) may be contained within portions of the LED fixture housing such as within a portion of an end piece 110 and/or the frame 112. In some embodiments, each LED light source group includes components such as a plurality of LEDs (such as BSY+R LEDs), driver circuitry which may be contained on one or more printed-circuit boards (PCBs), one or more heat sink(s), and electrical lead wires for connecting to one or more power supplies (not shown). In some implementations, the LED luminaire 100 may also include a processor to control one or more of output light intensity, color, and a desired shape of the light provided by the LED light sources (not shown).

Referring again to FIG. 1, as mentioned above two or more LED luminaires 100 may be connected together to provide a long continuous row of LED light, uninterrupted by dark spots between fixtures, which creates a sleek, dramatic effect. In some embodiments, a rail fastening system is utilized (not shown) which allows attachment of each LED luminaire fixture from wherever the ceiling supports are located. In addition, in some implementations the LED luminaires 100 are designed to snap together end-to-end, which saves installation time and labor costs. The long rated life of the LED light sources (about a 65,000-hour life) virtually eliminates maintenance costs, and their efficient use of power (typically in the range of about 125-135 lm/W in normal operating mode) lowers energy expenses. In some embodiments, in the normal mode of operation the LED luminaires 100 deliver a visually appealing white light having an 90 CRI value with minimal glare.

Figure 2A:
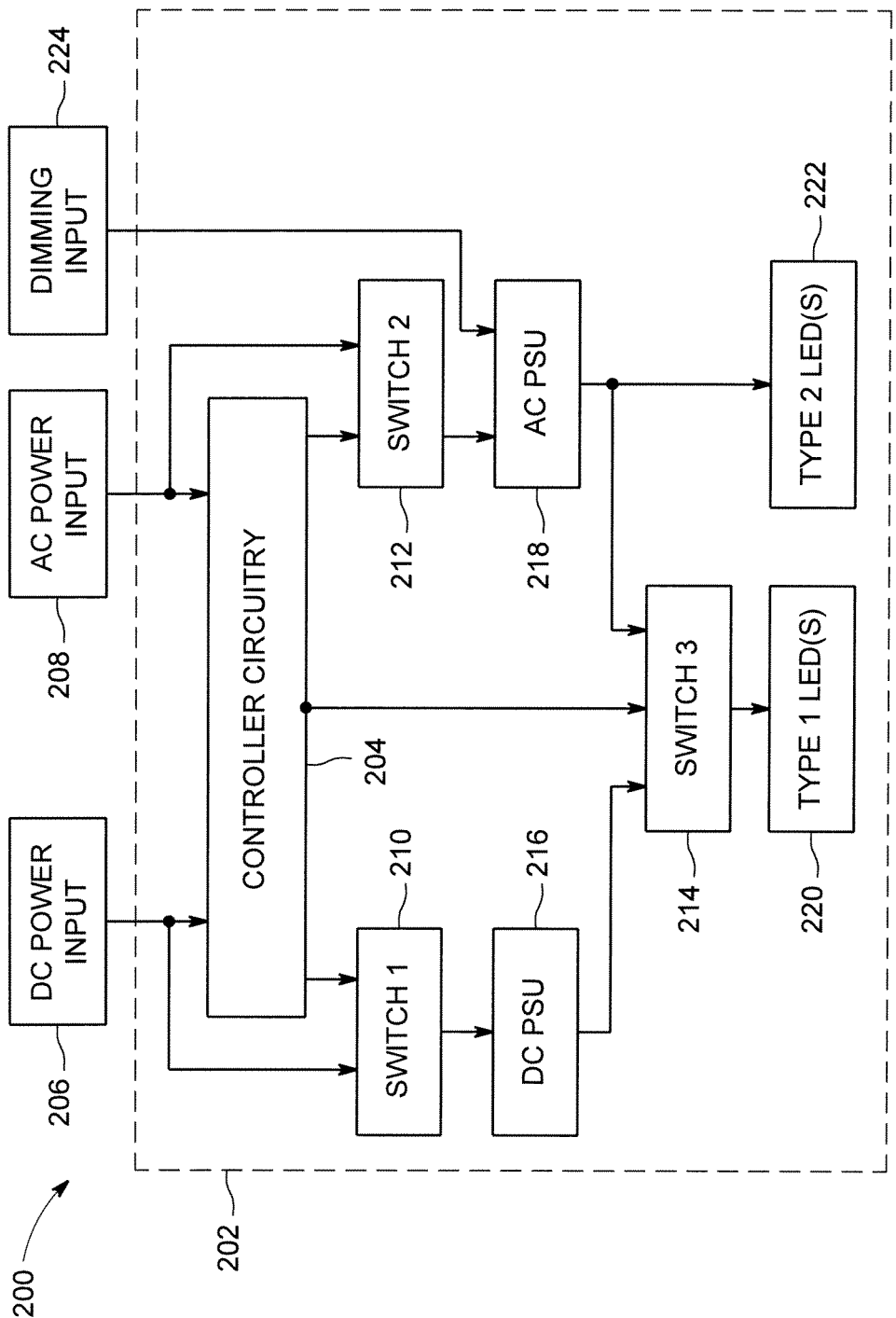
FIG. 2A is block diagram of the electrical components of an LED luminaire such as the LED luminaire of FIG. 1 according to an embodiment of the disclosure.

FIG. 2A is a block diagram 200 of the electrical components of an LED luminaire, such as the LED luminaire 100 of FIG. 1, according to some embodiments. The dotted line 202 represents an LED Luminaire housing, which may include the central housing 101 and/or the reflectors 104 and 106 of the LED luminaire 100 shown in FIG. 1. The LED luminaire housing includes controller circuitry 204 that has a DC power input 206 and an AC power input 208. The AC power input 208 may be obtained from a mains power system for operating household and/or light commercial electrical appliances and lighting having a voltage generally in the range of about 100 Volts (V) to about 400 V at frequencies of about 50 Hertz (Hz) or of about 60 Hz, depending on the jurisdiction. The DC power input 206 may be connected to a global backup battery (not shown) that provides DC battery power. The controller circuitry 204 is configured to control a first switch 210, a second switch 212, and a third switch 214. The output of the first switch 210 is connected to a DC Power Supply Unit (PSU) 216, and output of the second switch 212 is connected to an AC PSU 218. Both the DC PSU 216 and the AC PSU 218 are connected to the third switch 214, which has an output connected to LED groups of a first type of LED light sources, for example, groups of Blue-Shifted Yellow (BSY) LED light sources. In addition to having an output connected to the third switch 214, the AC PSU 218 includes an output connected to LED groups of a second type of LED light sources, for example, Red LED light sources. It should also be noted that the first switch 210 has an input from the DC power input line 206, and that a Dimming input line 224 is connected to the AC PSU 218. The Dimming input line 224 may originate from a dimming switch (not shown) operable by a user or consumer to dim the light emitted from the LED light fixture or LED luminaire when it is operating in a normal mode of operation (when powered by AC power from the AC power input 208).

Referring again to FIG. 2A, when the LED luminaire is operating in a normal mode then the AC power input 208 supplies power, and the control circuitry 204 operates to maintain the second switch 212 and the third switch 214 in the ON position so that current flows to the type one LED light sources 220 via the third switch 214 and AC PSU 218, and to the type two LED light sources 222 via the second switch 212 and the AC PSU 218. Thus, in the normal operating mode, the LED luminaire 200 operates to illuminate both the first group of a first type of LED light sources and the second group of a second type of LED light sources. For example, in normal mode BSY LEDs and Red LEDs which together form BSY+R LED light source groups are powered to emit a substantially white light from the LED luminaire. However, if the AC power supply 208 is switched OFF (for example, due to a power outage or manually switched OFF by a person, for example, a warehouse worker) then the controller circuitry 204 selects a battery backup mode of operation and functions to switch OFF the second switch 212, and to switch ON the first switch 210 and third switch 214 to connect the DC power supply 206 via the DC PSU 216 and through the third switch 214 to the groups of the first type of LEDs 220. Thus, in the security mode or battery backup mode of operation, only the groups containing the BSY LED light sources are ON to emit a mint-white light from the LED luminaire. The second switch 212 is switched OFF to prevent any leakage current from the AC power input 208 from reaching the type two LED light sources 222, which could be important, for example, to prevent a false signal from being given to occupants of a building who would know to exit the building when the mint-white light appears for security purposes.

Thus, in the security mode or battery backup mode of operation, only the first type of LED light sources 220 are illuminated at a lower current than normal mode, whereas the LED light source groups that include the second type of LED light sources 222 are turned OFF. In this manner, when AC power is removed the controller circuitry 204 operates to place the LED luminaire in a low power mode of operation, which extends battery life of the DC power source (a battery), while still providing adequate light to perform tasks, such as security searches and/or cleaning or maintenance work and/or inventory checks.

Referring again to FIG. 2A, during the normal mode of operation when AC power is being provided on the AC power input line 208, a user or consumer may wish to dim the white light being provided by the LED luminaire 200. In order to do so, the user may adjust a dimming switch (not shown) associated with the Dimming input 224 to adjust the AC PSU 218 by lowering the amount of current passing through the AC PSU and thus to the third switch 214 and to the LED groups (which include the first type of LED light sources 220 and the second type of LED light sources 222). In this manner, the overall light output may be dimmed if desired, for example, to save on electricity costs.

Figure 2B:
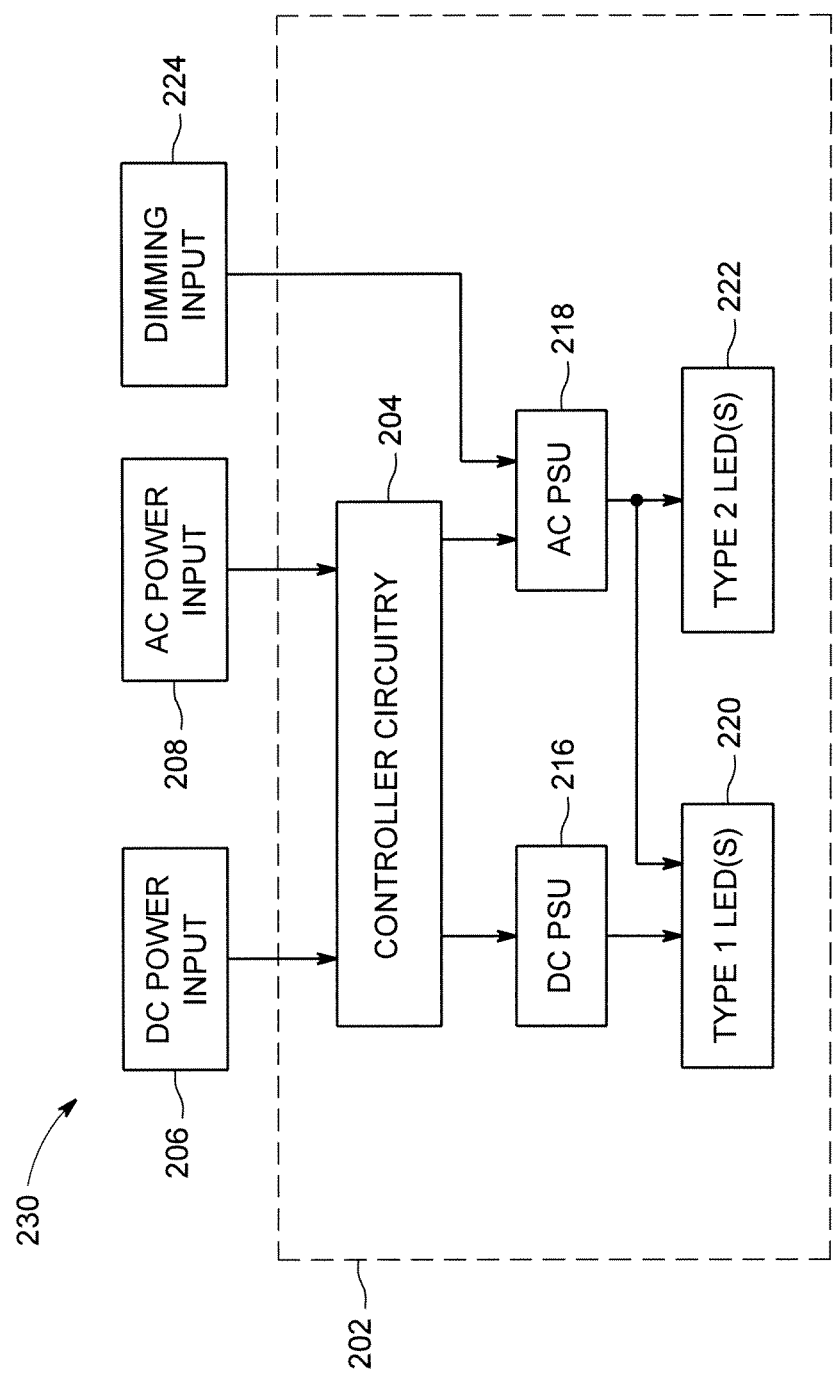
FIG. 2B is block diagram of the electrical components of an LED luminaire according to another embodiment of the disclosure.

FIG. 2B depicts a block diagram 230 of another configuration of electrical components of an LED luminaire in accordance with some embodiments. The dotted line 202 again represents an LED Luminaire housing, which may include the central housing 101 and/or the reflectors 104 and 106 of the LED luminaire 100 of FIG. 1. The LED luminaire housing includes controller circuitry 204 that has a DC power input 206 and an AC power input 208. As mentioned above with regard to FIG. 2A, the AC power input 208 may be obtained from a mains power system for operating household and/or light commercial electrical appliances and lighting, whereas the DC power input 206 may be connected to a global backup battery (not shown) that provides DC battery power. In this embodiment, the controller circuit 204 is connected directly to the DC Power Supply Unit (PSU) 216 and to the AC PSU 218. Both the DC PSU 216 and the AC PSU 218 are connected to the LED groups of a first type of LED light sources 220, for example, groups of Blue-Shifted Yellow (BSY) LED light sources, and the AC PSU 218 is additionally connected to the LED groups of the second type of LED light sources 222, for example, Red LED light sources. In addition, a Dimming input line 224 is connected to the AC PSU 218.

Referring again to FIG. 2B, the controller circuitry 204 is configured and operates to control the switching of the DC power source 206 to the DC Power Supply Unit (PSU) 216, and operates to control the switching of the AC power source 208 to the AC PSU 218. In the normal mode of operation when AC power is being supplied, sensor circuitry (not shown) of the controller circuit 204 functions to ensure that the AC power from the AC power source 208 is at or above an adequate, predetermined threshold level (predetermined current and/or voltage level) and if so permits AC power from the AC power source 208 to flow to the AC PSU 218, which in turn powers both the first type of LED light sources 220 and the second type of light sources 222 so that they are illuminated. However, if the sensor circuitry of the controller circuit 204 senses that AC power has dipped or decreased below the predetermined AC power level then the controller circuit 204 enters the security mode of operation by preventing AC power to flow to the AC PSU 218 and allowing the DC power from the DC power source 206 (the global battery) to flow to only the first type of LED light sources 220. Thus, in the security mode or battery backup mode of operation, only the first type of LED light sources 220 are illuminated. Thus, when AC power is removed or falls below the predetermined threshold level, the controller circuit 204 operates to place the LED luminaire in a low power mode of operation, which extends battery life of the DC power source (a battery), while still providing adequate light to perform tasks.

In FIG. 2B, when the LED luminaire is operating in the normal mode, then AC power is being provided by the AC power input line 208 to the first and second types of LEDs, as explained above. In this case, if a user or consumer wishes to dim the white light being provided by the LED luminaire, then he or she may use a dimming switch (not shown) to adjust the AC PSU 218 via the Dimming input 224 to lower the amount of current passing through the AC PSU and thus to the LED groups of first type of LED light sources 220 and to the LED groups of the second type of LED light sources 222. In this manner, the overall light output may be dimmed if desired, for example, to save on electricity costs.

Figure 2C:
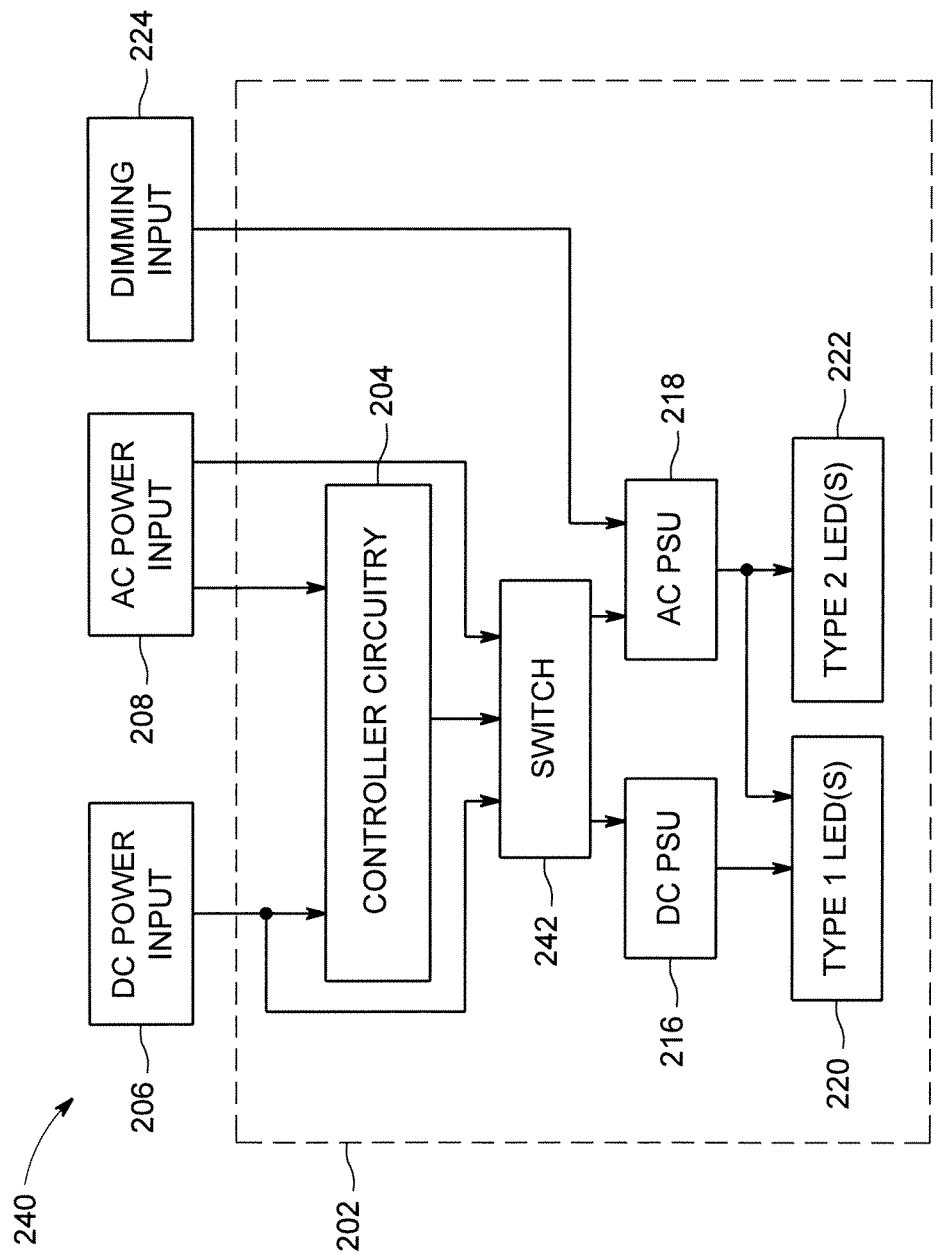
FIG. 2C is block diagram of the electrical components of an LED luminaire according to yet another embodiment of the disclosure.

FIG. 2C depicts a block diagram 240 of yet another configuration of electrical components of an LED luminaire in accordance with some embodiments. The dotted line 202 again represents an LED Luminaire housing, which may include the central housing 101 and/or the reflectors 104 and 106 of the LED luminaire 100 of FIG. 1. The LED luminaire housing includes a controller circuit 204 that has a DC power input 206 and an AC power input 208. As mentioned above with regard to FIG. 2A, the AC power input 208 may be obtained from a mains power system for operating household and/or light commercial electrical appliances and lighting, whereas the DC power input 206 may be connected to a global backup battery (not shown) that provides DC battery power. The DC power input 206, the AC power input 208, and the controller circuit 204 are each connected to a switch 242. In some implementations, the switch 242 is a mechanical toggle switch, which functions to permit only one input power line to be output at a time. As shown, the switch 242 has outputs connected to the DC Power Supply Unit (PSU) 216 and to the AC PSU 218. Both the DC PSU 216 and the AC PSU 218 are connected to the LED groups of a first type of LED light sources 220, for example, groups of Blue-Shifted Yellow (BSY) LED light sources. The AC PSU 218 is additionally connected to the LED groups of the second type of LED light sources 222, for example, Red LED light sources. In addition, a Dimming input line 224 is connected to the AC PSU 218.

With reference again to FIG. 2C, the controller circuitry 204 is configured to sense when the AC power from the AC power source 208 is at an adequate, predetermined level (current and/or voltage level) and then to control the switch 242 to permit AC power from the AC power source 208 to flow to the AC PSU 218 so that both the first type of LED light sources 220 and the second type of light sources 222 are illuminated. The controller circuitry 204 is also configured to sense when the AC power from the AC power source 208 is inadequate because it is below a predetermined threshold level (current and/or voltage level), and then to control the switch 242 to connect the DC power source 206 to the DC Power Supply Unit (PSU) 216 while at the same time disconnecting the AC power input 208 to prevent any leakage current from flowing to the AC PSU 218 (and to the second type of LEDs 222). In particular, in some implementations the switch 242 is configured to function to connect only one of the AC power source 208 to the AC PSU or the DC power source 206 to the DC PSU, but never at the same time. Thus, in the normal mode of operation sensor circuitry (not shown) of the controller circuit 204 senses that adequate AC power is present and thus controls the switch 242 to permit only AC power to flow to the AC PSU 218, which functions to power both the first type of LEDs 220 and the second type of LEDs 222. In the security mode of operation, which occurs when the sensor circuitry of the controller circuit 204 senses that AC power has dipped or decreased below the predetermined threshold AC power level, the switch 242 is operated to prevent AC power to flow to the AC PSU 218 and to allow only DC power from the DC power source 206 (the global battery) to flow to only the first type of LED light sources 220. Thus, in the security mode or battery backup mode of operation, only the low-power light source groups that include the first type of LED light sources 220 are illuminated. Therefore, when AC power is removed the controller circuit 204 operates to control the switch 242 to place the LED luminaire in a low power mode of operation, which extends battery life of the DC power source (a battery), while still providing adequate light to perform tasks.

In FIG. 2C, when the LED luminaire is operating in the normal mode, then AC power is being provided by the AC power input line 208 to the AC PSU 218 and thus to the first and second types of LEDs, as explained above. In this case, if a user or consumer wishes to dim the white light being provided by the LED luminaire, then he or she may use a dimming switch (not shown) to adjust the AC PSU 218 via the Dimming input 224 to lower the amount of current passing through the AC PSU and to the LED groups of first type of LED light sources 220 and to the LED groups of the second type of LED light sources 222. In this manner, the overall light output may be dimmed if desired, for example, to save on electricity costs.

Figure 3:
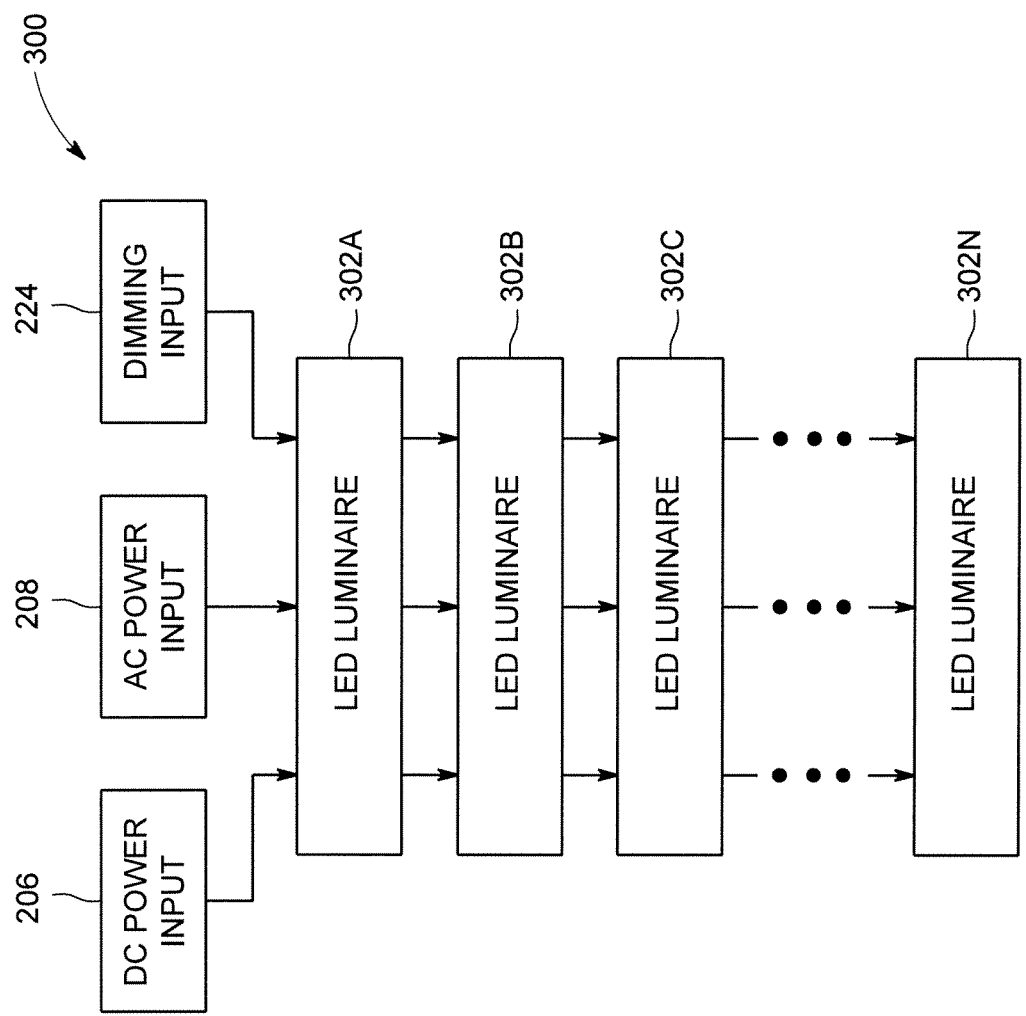
FIG. 3 is a block diagram of the electrical connections between a plurality of LED luminaires in accordance with some embodiments of the disclosure.

FIG. 3 is a block diagram 300 of the electrical interconnections between a plurality of LED luminaires in accordance with some embodiments. A plurality of LED luminaires 302A, 302B, 302C to 302N is shown connected in a series, or in a "daisy chain", configuration. Thus, the LED luminaire 302A includes a DC power input 206, an AC power input 208, and a Dimming switch input 224 and operates in the manner described herein. The LED luminaire 302A includes output connectors that provide connection to the same DC power input 206, AC power input 208, and Dimming switch input 224 lines which are connected to the LED luminaire 302B, and the LED luminaire 302B provides those same lines to the LED luminaire 302C, and so forth to the last LED luminaire 302N in the series connection of LED luminaires. In this manner, each LED luminaire 302A, 302B, 302C to 302N operates in the same manner when in normal operating mode, security mode, and/or when the user wished to dim the output illumination when normal AC power is being provided.

Thus, LED fixtures or LED luminaires in accordance with the embodiments described herein may advantageously provide improved security light operational capabilities in comparison to conventional security light systems. In particular, the fact that the Red LED light source groups are switched OFF during a security mode of operation results in improved backup battery life while still providing satisfactory emergency lighting.

In addition, LED luminaires in accordance with the embodiments described herein beneficially provide improved lighting coverage, for example, in a warehouse setting because each luminaire is illuminated when in the security mode. In contrast, conventional backup battery lighting systems save power by illuminating only a small percentage (typically ten percent or less) of the luminaires in a room.

The above descriptions and/or the accompanying drawings are not meant to imply a fixed order or sequence of steps for any process referred to herein; rather any process may be performed in any order that is practicable, including but not limited to simultaneous performance of steps indicated as sequential.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. An LED light fixture, comprising:
a housing;
a controller circuit within the housing having a direct current (DC) power input and an alternating-current (AC) power input;
a direct-current (DC) power supply unit (PSU) connected to the controller circuit within the housing;
an alternating-current (AC) power supply unit (PSU) connected to the controller circuit within the housing; and
at least two groups of light emitting diodes (LEDs) operable to emit light, wherein each group comprises at least one LED of a first type and at least one LED of a second type;
wherein when the LED light fixture operates in a security mode, the controller circuit prevents power from flowing to the AC PSU and allows power to flow to the DC PSU to power only the first type of LEDs of the at least two groups of LEDs to emit a security light.

2. The LED light fixture of claim 1, wherein the security mode of operation is initiated when the controller circuit senses that AC power from the AC power input is below a predetermined AC power threshold level.

3. The LED light fixture of claim 1, further comprising a dimming switch input connected to the AC PSU, the dimming switch input operable in a normal mode to dim the light emitted by the at least two groups of LEDs.

4. The LED light fixture of claim 1, wherein the first type of LEDs are blue-shifted-yellow (BSY) LEDs and emit a mint-white light when powered.

5. The LED light fixture of claim 1, wherein the second type of LEDs are red (R) LEDs and emit red light when powered.

6. The LED light fixture of claim 1, wherein the at least two groups of LEDs comprise blue-shifted-yellow (BSY) LEDs and red (R) LEDs (BSY+R LEDs).

7. A method, comprising:
sensing, by a controller circuit, that alternating current (AC) power to an LED light fixture from an AC power source is below a predetermined AC power threshold level; and
switching, by the controller circuit, from a normal mode of operation of the LED light fixture to a security mode of operation of the LED light fixture, wherein the security mode of operation comprises:
preventing alternating current (AC) power from flowing to an AC power supply unit (PSU) and to a plurality of light-emitting diode (LED) groups, wherein each LED group comprises at least one LED of a first type and at least one LED of a second type; and
allowing direct current (DC) to flow from a DC power source to a DC PSU and to only the first type of LEDs of the plurality of LED groups to emit a security light.

8. The method of claim 7, wherein when the AC power is above the predetermined AC power threshold level, the LED light fixture operates in the normal mode and a white light is emitted from the plurality of LED groups.

9. The method of claim 7, wherein when the LED light fixture is operating in the security mode, a mint-white light is emitted from the first type of LEDs of the plurality of LED groups.

10. An LED light fixture, comprising:
a housing;
a controller circuit within the housing having a direct current (DC) power input and an alternating-current (AC) power input;
at least one switch connected to the controller circuit within the housing;
a direct-current (DC) power supply unit (PSU) connected to the at least one switch within the housing;
an alternating-current (AC) power supply unit (PSU) connected to the at least one switch within the housing; and
at least two groups of light emitting diodes (LEDs) operable to emit light, wherein each group comprises at least one LED of a first type and at least one LED of a second type;
wherein when the LED light fixture operates in a security mode, the controller circuit controls the at least one switch to prevent power from flowing to the AC PSU and allows power to flow to the DC PSU to power only the first type of LEDs of the at least two groups of LEDs to emit a security light.

11. The LED light fixture of claim 10, wherein the security mode of operation is initiated when the controller circuit senses that AC power from the AC power input is below a predetermined AC power threshold level.

12. The LED light fixture of claim 10, wherein the at least one switch comprises a first switch with inputs connected to the DC power input and to the controller circuit and having an output connected to the DC PSU, a second switch with inputs connected to the AC power input and the controller circuit and having an output connected to the AC PSU, wherein the first switch is in the OFF position and the second switch is in the ON position when the LED light fixture operates in a normal mode of operation, and wherein the first switch is in the ON position and the second switch is in the OFF position when the LED light fixture operates in the security mode.

13. The LED light fixture of claim 12, further comprising a third switch having inputs from the controller circuit, the DC PSU, and the AC PSU and an output to the first type of LEDs of the at least two groups of LEDs.

14. The LED light fixture of claim 10, further comprising a dimming switch input connected to the AC PSU, the dimming switch input operable in a normal mode of operation to dim the light emitted by the at least two groups of LEDs.

15. The LED light fixture of claim 10, wherein the first type of LEDs consume less power than the second type of LEDs.

16. The LED light fixture of claim 10, wherein the first type of LEDs are blue-shifted-yellow (BSY) LEDs and emit a mint-white light when powered.

17. The LED light fixture of claim 10, wherein the second type of LEDs are red (R) LEDs and emit red light when powered.

18. The LED light fixture of claim 10, wherein the at least two groups of LEDs comprise blue-shifted-yellow (BSY) LEDs and red (R) LEDs (BSY+R LEDs).

* * * * *